(12) United States Patent
Moram et al.

(10) Patent No.: US 8,719,316 B2
(45) Date of Patent: May 6, 2014

(54) WRITE AGENT DELAYED WRITE TO DATA STORES

(75) Inventors: Venugopala Rao Moram, Redmond, WA (US); Marcus K. Swenson, Duvall, WA (US); Lizhong Huang, Sammamish, WA (US); Nikhil Bahubali, Redmond, WA (US); Christopher John Saam, Redmond, WA (US); Christopher J. Gariepy, Bothell, WA (US); Apurva F. Dalia, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 13/107,768

(22) Filed: May 13, 2011

(65) Prior Publication Data

US 2012/0290627 A1    Nov. 15, 2012

(51) Int. Cl.
    *G06F 17/30*    (2006.01)
(52) U.S. Cl.
    USPC ........................................... 707/812
(58) Field of Classification Search
    USPC ........................................... 707/812
    See application file for complete search history.

(56) References Cited

U.S. PATENT DOCUMENTS

| 7,788,288 | B1 | 8/2010 | Wechsler |  |
|---|---|---|---|---|
| 7,801,912 | B2 | 9/2010 | Ransil et al. |  |
| 8,301,600 | B1* | 10/2012 | Helmick et al. | 707/648 |
| 2006/0184819 | A1* | 8/2006 | Takagi | 714/4 |
| 2007/0192544 | A1* | 8/2007 | Frolund et al. | 711/135 |
| 2009/0259817 | A1* | 10/2009 | Sharma et al. | 711/162 |
| 2010/0070473 | A1 | 3/2010 | Swett et al. |  |
| 2011/0208933 | A1* | 8/2011 | Selfin et al. | 711/162 |

OTHER PUBLICATIONS

MSDTC, Pub. Date: Feb. 14, 2011 (Retrieved Date), (3 pages).
Harry L., Transaction Propagation in WCF, Pub. Date: Feb. 14, 2011 (Retrieved Date), (11 pages).
Oracle TimesTen In-Memory Database, Pub. Date: Aug. 2009, (216 pages).
Fiuseppe Decandia, et al., Dynamo: Amazon's Highly Available Key-value Store, Pub. Date: Oct. 14-17, 2007, pp. 205-220.
Sudipto Das, et al., G-Store: A Scalable Data Store for Transactional Multi key Access in the Cloud, Pub. Date: Jun. 10-11, 2010, pp. 163-174.

* cited by examiner

*Primary Examiner* — Rehana Perveen
*Assistant Examiner* — Thuy Bui
(74) *Attorney, Agent, or Firm* — Kate Drakos; Raghu Chinagudbha; Micky Minhas

(57) ABSTRACT

The reliable writing of data to multiple data stores using a write agent. The overall write operation is managed by a write manager that is communicatively coupled to the write agent and to a certain data store. Upon determined that multiple data stores are to be written to, the write manager first instructs the write agent to perform a delay write to other data store(s). The delay write means that the write agents waits a delay time before performing the write unless instructed in the meantime to more immediately perform the write, and if a delay passes, does not perform the write without first checking that the write has been made to the certain data store. After instructing the write agent to delay write, the write manager attempts to write to the certain data store. Upon successfully writing to the certain data store, the write manager may instruct the write agent to proceed immediately.

9 Claims, 5 Drawing Sheets

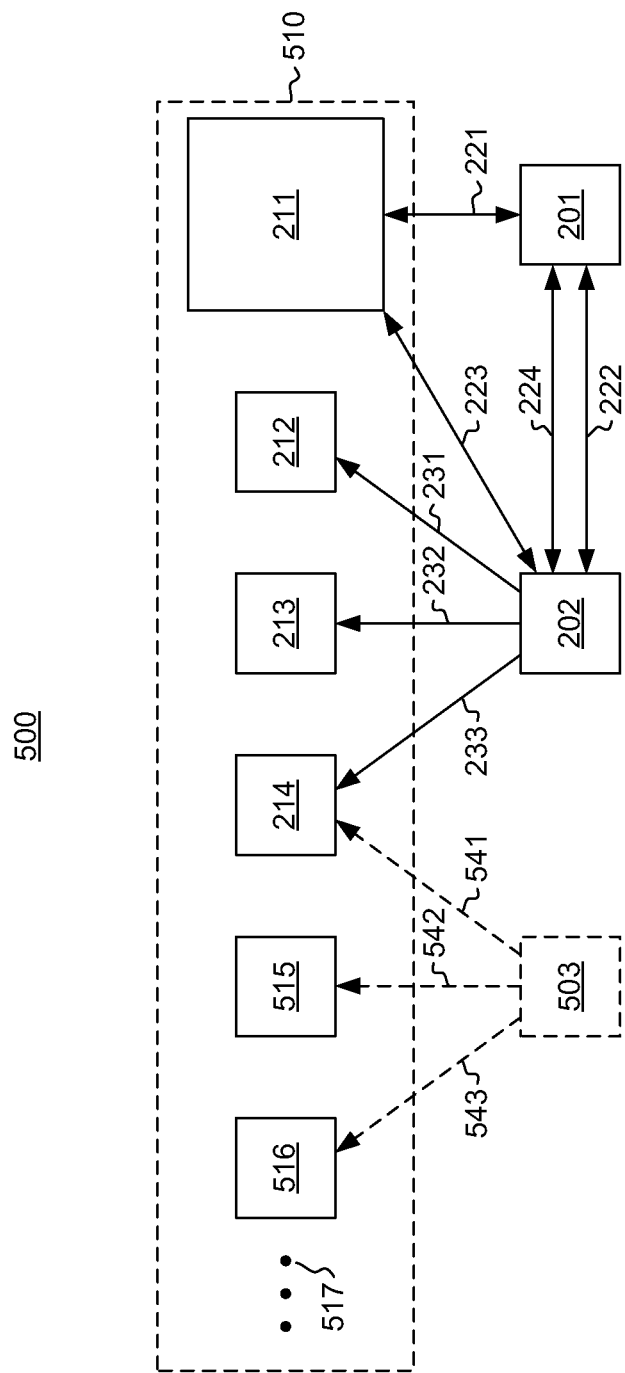

WRITE AGENT DELAYED WRITE TO DATA STORES

BACKGROUND

A data store is a system that is capable of storing information. An example of a data store is a database. Web-based services often use multiple data stores that are often distributed. As part of a single task, a service often writes data to a set of data stores. While the same data might not be written to each data store in the set of data stores as part of the write action, the data is at least to be written atomically to each in the set of data stores. That is to say, the associated data is either written to the data store for all the data stores in the set of data stores, or the associated data is not written to any of the data stores.

One conventional mechanism for writing to multiple data stores is a Distributed Transaction Coordinator (DTC). A distributed transaction coordinator coordinates transactions that update multiple transaction-protected resources, such as databases, message queues, and file systems.

BRIEF SUMMARY

At least one embodiment described herein relates to the reliable writing of data to multiple data stores using a write agent. The overall write operation is managed by a write manager that is communicatively coupled to the write agent and to a certain data store (perhaps a master data store). The write agent is communicatively coupled to that same certain data store as well as to at least one other data store.

Upon determined that multiple data stores are to be written to, the write manager first instructs the write agent to perform a delay write to the other data store(s). The delay write means that the write agents waits a delay time before performing the write unless instructed in the meantime to more immediately perform the write. After instructing the write agent to delay write, and within the period for the delay, the write manager attempts to write to the certain data store.

In one embodiment, upon successfully writing to the certain data store, the write manager instructs the write agent to proceed immediately with the write to the other data store(s). If the delay should pass without such an instruction, the write agent checks the certain data store to see if the write had been performed. If it has, then the write agent proceeds with the write to the other data store(s). If it has not, then the write agent abstains from writing to the other data store(s).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 5 illustrates an alternative example environment in which writes may be atomically made to a number of data stores using a write manager and at several write agents.

DETAILED DESCRIPTION

In accordance with embodiments described herein, the reliable writing of data to multiple data stores using a write agent is described. The overall write operation is managed by a write manager that is communicatively coupled to the write agent and to a certain data store. Upon determined that multiple data stores are to be written to, the write manager first instructs the write agent to perform a delay write to other data store(s). After instructing the write agent to delay write, the write manager attempts to write to the certain data store. Upon successfully writing to the certain data store, the write manager may instruct the write agent to proceed immediately. First, some introductory discussion regarding computing systems will be described with respect to FIG. 1. Then, the embodiments of the reliable writing will be described with respect to FIGS. 2 through 5.

Figure 1:
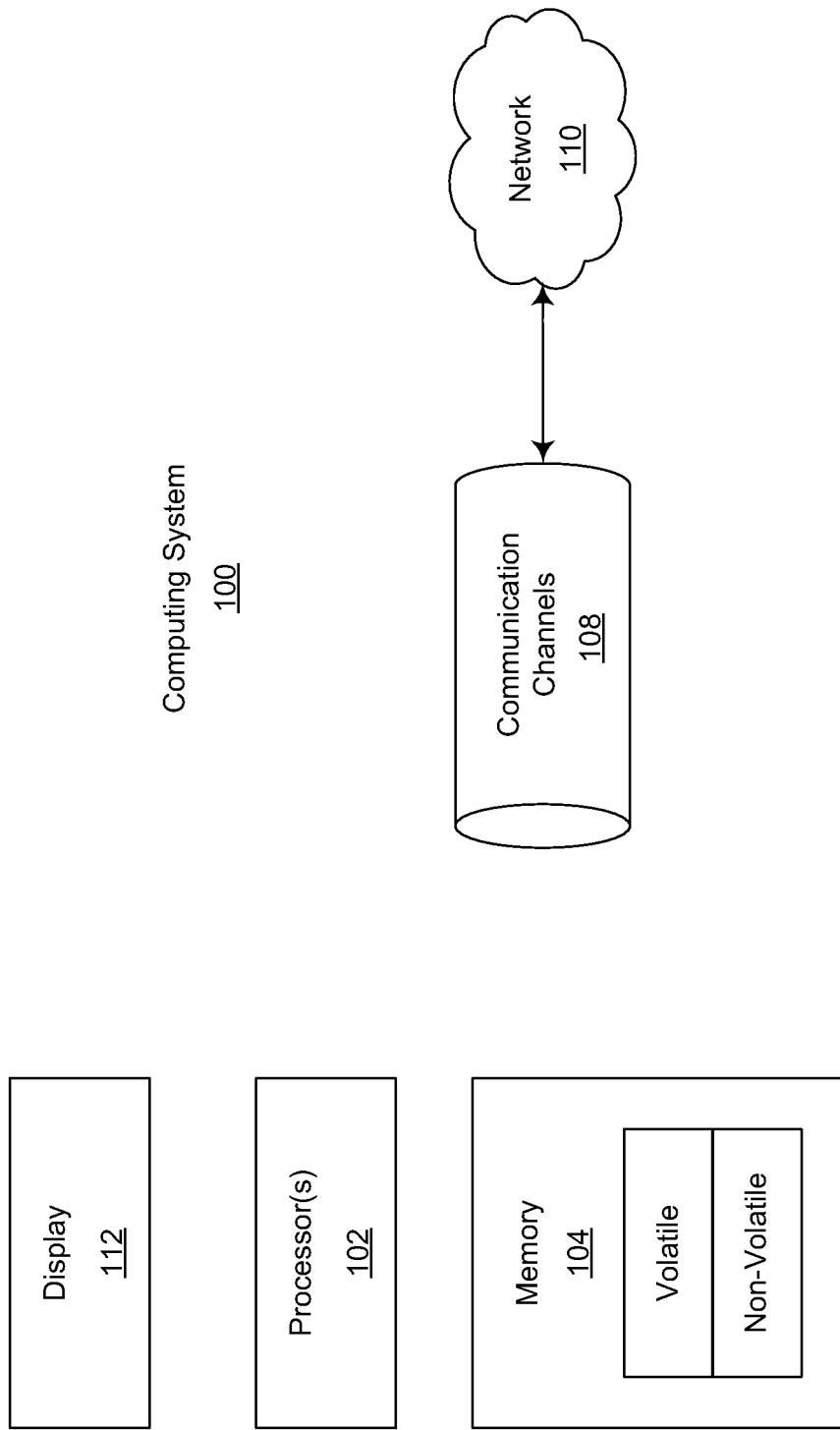
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
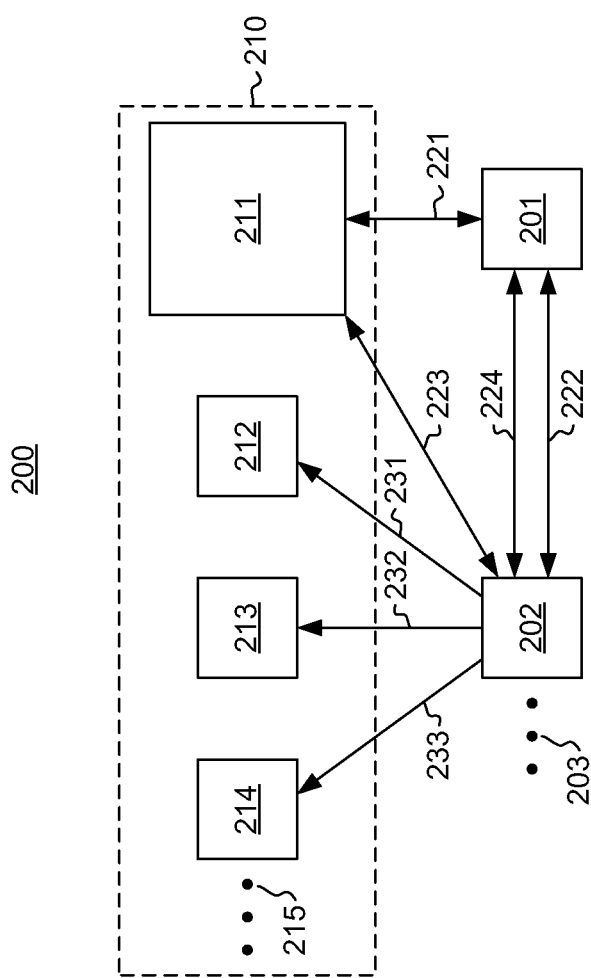
FIG. 2 illustrates a first example environment in which writes may be atomically made to a number of data stores using a write manager and at least one write agent.

FIG. 2 illustrates an environment 200 in which writes may be atomically made to a number of data stores 210. The environment may be on a single computing system but may also be distributed across a number of different computing systems, and may even be globally distributed. In the illustrated example of FIG. 2, there are four data stores 211 through 214 included within the data stores 210. However the ellipses 215 represent that there may be other numbers of data stores from as few as two to as many as limitless included within the data stores 210. The data stores may be any system capable of storing information. An example includes a database. However, the data store may also be a cloud-based data store, and may itself perhaps be distributed.

The environment 200 includes a write manager 201 and a write agent 202 that cooperatively act so that when information is to be written to the data stores 201 through 214, the corresponding information to be written (which may be the same or different across the data stores) is either written to all of the data stores that are to be written to as part of the atomic write or to none of the data stores. This atomic writing across data stores helps ensure consistent state of operation across all data stores.

The write agent 202 is "communicatively coupled" to data stores 212 through 214 in the sense that the write agent 202 is capable of writing information to the data stores 212 through 214 as represented by corresponding arrows 231 through 233. The write agent 202 is also "communicatively coupled" to data store 211 in the sense that the write agent 202 is capable of confirming whether or not the write manager 201 has successfully written to the data store 211, and perhaps also be able to acquire the information to be written to the data stores 212 through 214 from the data store in the case in which the same information is to be written to all of the data stores 211 through 214.

In one embodiment, the data store 211 will be termed a "master" data store in the sense that, in accordance with the principles described herein, the write agent 202 does not write to the "non-master" data stores 212 through 214 until the write agent 202 confirms that the write manager 201 has written to the master data store 211.

Figure 3:
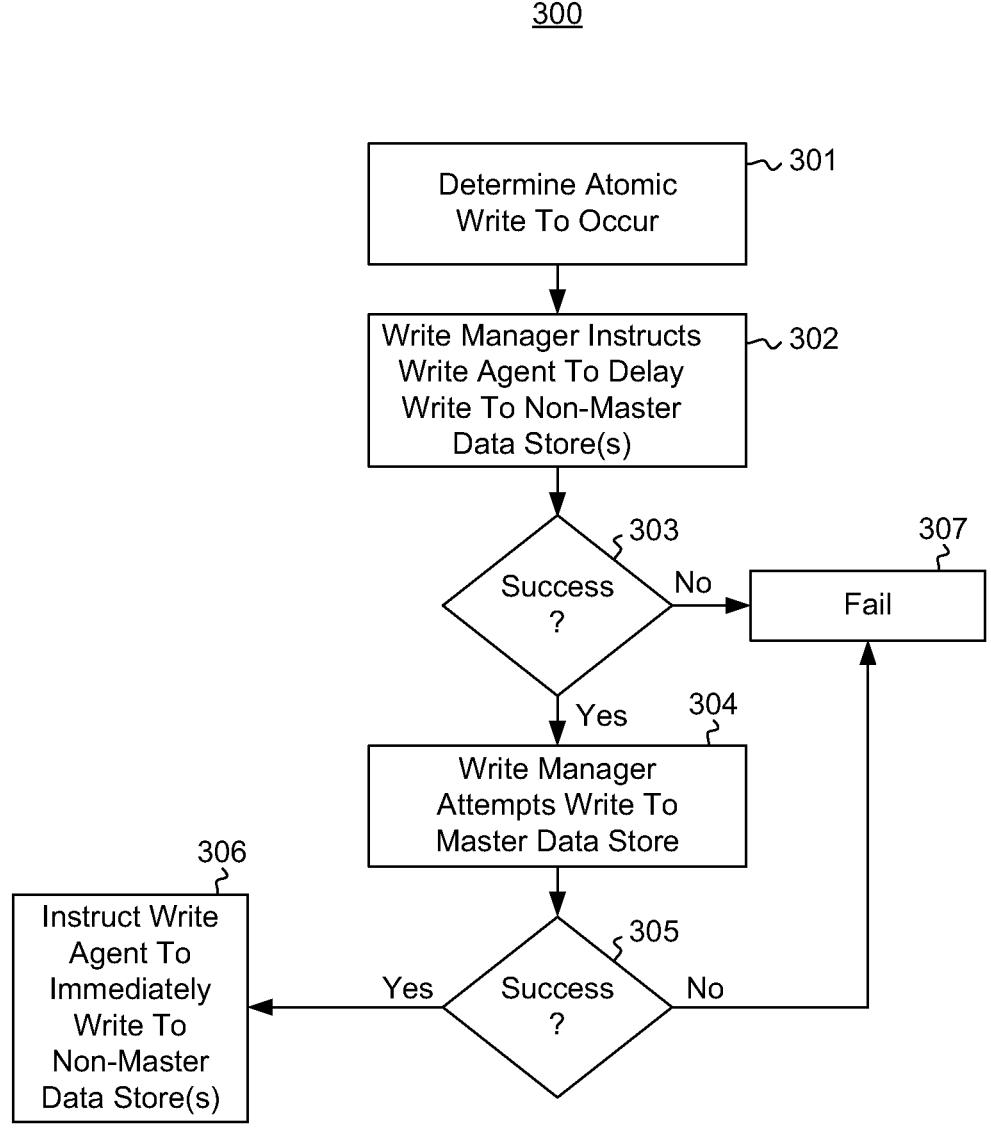
FIG. 3 illustrates a flowchart of a method for atomically writing to multiple data stores in accordance with a first process.

FIG. 3 illustrates a flowchart of a method 300 for atomically writing to a plurality of data stores using a process executed by the write master 201. The method 300 may be initiated when the write manager determines that an atomic write is to be performed on multiple data stores (act 301). One of the multiple data stores is the master data store. For instance, in FIG. 2, the write manager 201 is communicatively coupled to the master data store 211.

The write manager instructs the write agent to "delay write" to the corresponding master data stores (act 302). For instance, in an example used often hereinafter (referred to as the "reference example"), the data stores 211 through 214 are to be written to. In FIG. 2, this delay write instruction is represented by arrow 222. In this description and in the claims, an instruction to "delay write" is an instruction to perform a write, but only after a delay. That delay period may be fixed, but may also be variable, and may perhaps depend on certain event(s). As an example only, in the reference example, suppose that the delay is to be one minute. The delay write may be turned into an immediate write with a subsequent instruction received during the delay period (represented by arrow 224 in FIG. 2). For instance, in the reference example, the write agent may receive an instruction to immediately write, and if received during the delay period of 1 minute, will cause the write agent to perform the write immediately, without waiting for the full minute to elapse.

The delay write is also conditional should the full delay period elapses. In that case, the delay will be conditioned upon a corresponding write having been made to the master data store 211. In the reference example, writes are made to each of the data stores 211 through 214 atomically. Such writes will be also be referred to herein as constituent writes since it forms part of the distributed write that is to be performed, or not performed, atomically. That is to say, the constituent writes are ultimately either all to be performed, or none to be performed. The constituent writes need not be the same as each other, although they may be, without restriction.

As one point of potential failure in the overall write operation, the write agent may not receive the instruction to delay write from the write manager. Accordingly, the flow of the method 300 branches depending on whether the write agent successfully received the delay write instruction (decision block 303). If the instruction to delay write was not received (No in decision block 303), then the write manager determines that the overall atomic write operation has failed (act 307). For instance, referring to FIG. 2, the write manager 201 may have received a failure message back from the write agent 202, or perhaps just did not receive a successful acknowledgement of the delay write instruction back from the write agent 202. Either a success or failure message received back from the write agent 202 is also represented by arrow 222 due to the bi-directional nature of arrow 221.

On the other hand, if the write agent does successfully receive the instruction to delay write (Yes in decision block 303), the method 300 proceeds. For instance, referencing FIG. 2, the write manager 201 may receive an acknowledgement that the delay write instruction was received (reference arrow 222). At this stage, however, recall that the write agent does not yet perform the corresponding constituent write(s) to the corresponding non-master data stores, but begins waiting the delay period. During the delay period, the write master attempts to write to the master data store (act 304). For instance, in FIG. 2, the write manager 201 attempts to write to the master data store 211 as represented by arrow 221. This is a second point of potential failure in the overall atomic write operation. The method 300 again branches depending on whether the write manager successfully writes to the master data store (decision block 305).

If the write manager does not successfully write to the master database (No in decision block 305), then the write manager determines that the atomic write operation has failed (act 307). For instance, referring to FIG. 2, the write manager 201 may have received a failure message back from the master data store 211, or perhaps just did not receive a successful acknowledgement of the write operation back from the data store 211. Either a success or failure message received back from the master data store 211 is also represented by arrow 221 due to the bi-directional nature of arrow 221. Returning back to decision block 305, if the write manager was able to write the constituent write to the master data store (Yes in decision block 305), the write agent then instructs the write agent to initiate the write to the corresponding non-master data stores (act 306).

Figure 4:
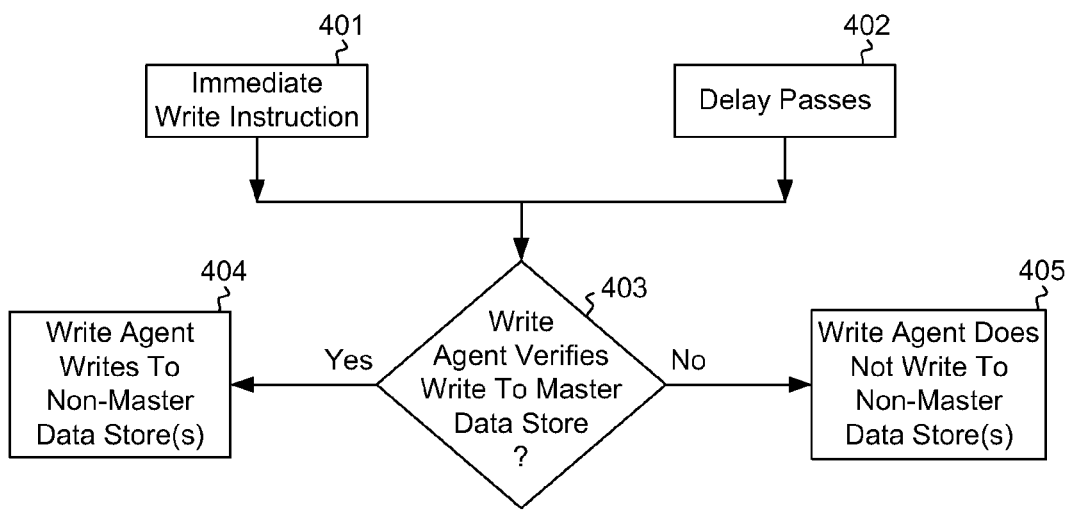
FIG. 4 illustrates a flowchart of a method for atomically writing to multiple data stores in accordance with a second process that is initiated at the write agent upon receiving a delay write instruction.

FIG. 4 illustrates a flowchart of a method for atomically writing to a plurality of data stores using a process executed by the write agent 202. The process 400 is initiated upon the write agent successfully receiving an instruction from the write manager to perform an "immediate write" to the corresponding non-master data stores. In that case, the write agent would verify that the write has been completed to the master store (decision block 403). Here, the write would have been verified in the master data store (Yes in decision block 403) since the write manager has issued the immediate write instruction. Accordingly, the write agent would perform the constituent write to the corresponding non-master data stores (act 404).

For instance, in the reference example with respect to FIG. 2, the write agent 202 would perform the constituent write operations to respective non-master data stores 212 through 214 if the write agent 202 were able to confirm the constituent write in the master data store 211. If the information to be written to any one of data stores 212 through 214 were the same as the information written to the master data store 211, then the write agent 202 may also acquire that information from the master data store 211 as part of the verification represented by arrow 223. On the contrary, if the information to be written to any of the data stores 212 through 214 were different, that information to be written to data stores 212 through 214 may be acquired from the delay write instruction represented by arrow 222.

On the other hand, if there is no immediate write instruction, then the write agent awaits the passage of the delay period (act 402). At that point, the write agent verifies whether the write manager performed the write on the master data store (decision block 403). A second point of failure is that the write agent may not receive an immediate write instruction from the write master, even though the write master successfully wrote to the master data store. If this failure were to occur, then the write agent would (after the delay period had elapsed) verify the constituent write was successfully made to the master data store (Yes in decision block 403). Accordingly, even if the write agent were not to receive the instruction to proceed immediately from the write manager, the write agent would still proceed with the constituent writes (act 404) after the period of delay. Upon completion of the constituent writes, the write agent optionally reports success to the write manager so that the write manager may determine that the atomic write operation was a success.

Alternatively, if the delay passes (act 402) without the write agent having received an instruction from the write manager to perform an immediate write, this could also mean that the write manager was not able to write to the master data store (No in decision block 305). Accordingly, the write agent will not verify that the constituent write is present in the master data store (No in decision block 402). Thus, to honor the atomic nature of the write operation, since the write to the master data store was unsuccessful, the write agent abstains from writing to the corresponding non-master data stores (act 405). Referring to FIG. 2, the write agent 202 verifies the write or the lack of the write in the master data store is represented in FIG. 2 by the arrow 223.

The methods 300 and 400 may be helpful in any circumstance in which reliable writes to data stores are desired to be performed atomically. As an example, the write manager may be a subscription manager for a variety of web services. The write manager may determine which data stores to update, depending on complex subscription information received from a customer. Rather than having the customer wait until all the data stores are updated, the write manager may report success as soon as the write agent(s) have been instructed to perform the delayed write, and as soon as the master database is written to.

Note that in FIG. 2, the ellipses 203 represents that there may be multiple write agents that are each interacting with the master data store 211 and the write manager 201 in the manner described for the write agent 202 with respect to FIGS. 2 and 3. For instance, FIG. 5 illustrates an alternative environment 500 in which, rather than have data stores 210, there are data stores 510. The data stores includes the master data store 211 and the non-master data stores 212 through 214 that are previously described above and also illustrated in FIG. 5 as being communicatively coupled to the first write agent 201. However, data stores 510 are also illustrated as including data stores 515 and 516 amongst potentially others as represented by the ellipses. In this example, there is a second write agent 503 that is communicatively coupled (as represented by arrows 541, 542 and 543, respectively) to data stores 214, 515 and 516, in the same manner as the first write agent 202 is communicatively coupled to data stores 212, 213 and 214 (as represented by arrows 231, 232 and 233, respectively).

Here, when an atomic write is to happen to multiple data sources that include data sources 515 or 516, then write manager 201 communicates the delay write instruction and the immediate write instruction to the second write agent. Furthermore, since both write agents 202 and 503 are coupled to the data source, the write manager 201 may choose either of the write agents 202 or 503 to perform the write to the data source 214.

Thus, an effective and reliable mechanism has been described for performing an atomic write operation on multiple data sources has been described. While the mechanism may be performed mostly using a write manager and a single write agent, multiple write agents may also be used consistent with the principles described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
one or more hardware processors;
a master data store;
a plurality of non-master data stores;
a write agent that is communicatively coupled to the plurality of non-master data stores and to the master data store; and
a write manager that is communicatively coupled to the master data store and to the write agent,
wherein the write manager is configured to perform at least the following upon determining that the master data store and the plurality of non-master data stores are to be atomically written to:
instructing the write agent to delay write to one or more of the plurality of non-master data stores;
after instructing the write agent to delay write, and within the period for the delay, attempting to write to the master data store; and
when the attempt to write to the master data store is successful, sending a subsequent instruction to the write agent, instructing the write agent to initiate the delay write to the one or more of the plurality of non-master data stores; and
wherein the write agent is configured to perform at least the following upon receiving instruction to delay write to one or more of the plurality of non-master data stores:
when the subsequent instruction has been received from the write manager prior to expiration of the period for the delay, the subsequent instruction indicative of the write master having made an associated write by in the master data store, performing the write to the one or more of the plurality of non-master data stores based upon receipt of the subsequent instruction; and
when the subsequent instruction has not been received from the write manager prior to expiration of the period for the delay, (i) confirming the presence of an associated write by the write master in the master data store, and (ii) when the associated write is confirmed to exist in the master data store, performing the write to the one or more of the plurality of non-master data stores.

2. The computer system in accordance with claim 1, wherein the write agent is further configured to perform the following:
when the associated write is not confirmed to exist in the master data store, abstaining from writing to the one or more of the plurality of non-master data stores.

3. The computer system in accordance with claim 2, wherein the write agent is further configured to perform the following:
when the associated write is not confirmed to exist in the master data store, reporting to the write manager that the write agent has not completed the write to the one or more of the plurality of non-master data stores.

4. The computer system in accordance with claim 1, wherein the master data store and the at least some of the plurality of non-master data stores are service subscription data stores.

5. The computer system in accordance with claim 4, wherein the write manager performs the act of instructing the write agent to delay write and the act of attempting to write to the master data store in response to an act of receiving a request for a subscription to a plurality of service subscriptions.

6. A computer program product comprising one or more hardware storage devices having stored thereon computer-executable instructions that are structured such that, when executed by one or more processors of a computing system, cause the computing system to perform at least the following:
a write manager determining that a master data store and a plurality of non-master data stores are to be atomically written to;
in response the write manager determining that the master data store and the plurality of non-master data stores are to be atomically written to, the write manager performing at least the following:
instructing a write agent to delay write to one or more of the plurality of data stores, wherein the write agent is configured to perform at least the following upon receiving instruction to delay write to the one or more of the plurality of non-master data stores:
when a subsequent instruction has been received from the write manager prior to expiration of the period for the delay, the subsequent instruction indicative of the write master having made an associated write in the master data store, performing the write to the one or more of the plurality of non-master data stores based upon receipt of the subsequent instruction; and
when the subsequent instruction has not been received from the write manager prior to expiration of the period for the delay, (i) confirming the presence of an associated write by the write master in the master data store, and (ii) when the associated write is confirmed to exist in the master data store, performing the write to the one or more of the plurality of non-master data stores, and wherein when the associated write is not confirmed to exist in the master data store, abstaining from writing to the one or more of the plurality of non-master data stores;
after instructing the write agent to delay write, and within the period for the delay, the write master attempting to write to the master data store.

7. The computer program product in accordance with claim 6, wherein when the attempt to write to the master data store is successful, the write manager instructs the write agent to initiate the delay write to the one or more of the plurality of data stores.

8. The computer program product in accordance with claim 6, wherein when the associated write is not confirmed to exist in the master data store, the write agent reports to the write manager that the write agent has not completed the write to the one or more of the plurality of non-master data stores.

9. A method, implemented at a computer system that includes one or more processors, for atomically writing to a plurality of data stores, the method comprising:

a write manager determining that a master data store and a plurality of non-master data stores are to be atomically written to;
in response the write manager determining that the master data store and the plurality of non-master data stores are to be atomically written to, the write manager performing at least the following:
instructing a write agent to delay write to one or more of the plurality of data stores, wherein the write agent is configured to perform at least the following upon receiving instruction to delay write to the one or more of the plurality of non-master data stores:
when a subsequent instruction has been received from the write manager prior to expiration of the period for the delay, the subsequent instruction indicative of the write master having made an associated write in the master data store, performing the write to the one or more of the plurality of non-master data stores based upon receipt of the subsequent instruction; and
when the subsequent instruction has not been received from the write manager prior to expiration of the period for the delay, (i) confirming the presence of an associated write by the write master in the master data store, and (ii) when the associated write is confirmed to exist in the master data store, performing the write to the one or more of the plurality of non-master data stores, and wherein when the associated write is not confirmed to exist in the master data store, abstaining from writing to the one or more of the plurality of non-master data stores;
after instructing the write agent to delay write, and within the period for the delay, the write master attempting to write to the master data store.

* * * * *